United States Patent [19]

Wold

[11] Patent Number: 5,601,236
[45] Date of Patent: Feb. 11, 1997

[54] PLANT WATERING DEVICE AND METHOD FOR PROMOTING PLANT GROWTH

[76] Inventor: Keith F. Wold, 2855 West 39th Avenue, Vancouver, British Columbia, Canada, V6N 2Z3

[21] Appl. No.: 374,317

[22] Filed: Jan. 18, 1995

[51] Int. Cl.$^6$ ............................ A01G 27/00; A01G 29/00
[52] U.S. Cl. ........................ 239/63; 239/69; 47/48.5
[58] Field of Search .................... 239/63, 64, 65, 239/68, 69; 47/48.5 G, 48.5 CR, 82; 405/37, 40, 41

[56] References Cited

U.S. PATENT DOCUMENTS

| | | | |
|---|---|---|---|
| 3,755,966 | 9/1973 | Smith | 47/48.5 G |
| 3,762,437 | 10/1973 | King, Sr. | 405/40 X |
| 4,156,396 | 5/1979 | Konucik | 405/40 X |
| 4,315,599 | 2/1982 | Biancardi | 239/10 |
| 4,396,149 | 8/1983 | Hirsch | 239/63 |
| 4,866,880 | 9/1989 | Weinblatt | 47/48.5 G X |
| 5,172,515 | 12/1992 | Lapshansky, Sr. et al. | 47/48.5 G |

*Primary Examiner*—Lee W. Young
*Attorney, Agent, or Firm*—Ridout & Maybee

[57] ABSTRACT

An autonomous plant watering and growth enhancement apparatus for arid climatic regions may include a solar powered Peltier unit or absorption cycle atmospheric vapor condensation module, to deliver a supply of water to a storage module. The stored water is supplied to a subsurface, site-specific delivery system located intimately with a target plant. The apparatus preferably utilizes fuzzy logic supervision provided with local sensing means and historical vapor pressure maps to control and predict water usage while controllably supplementing the delivered water with nutrients and anti-transpirants as needed.

18 Claims, 5 Drawing Sheets

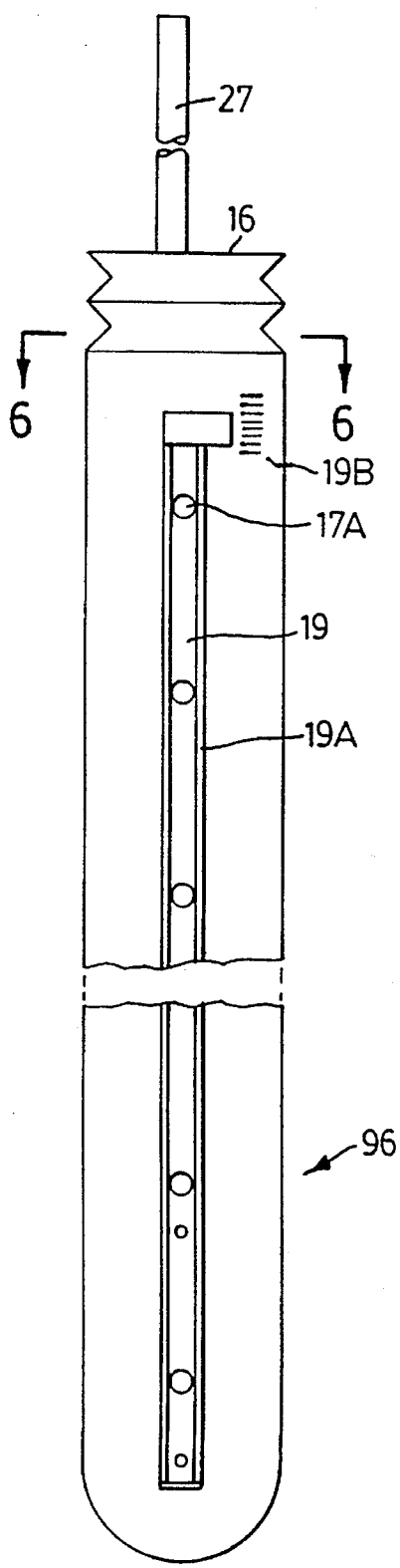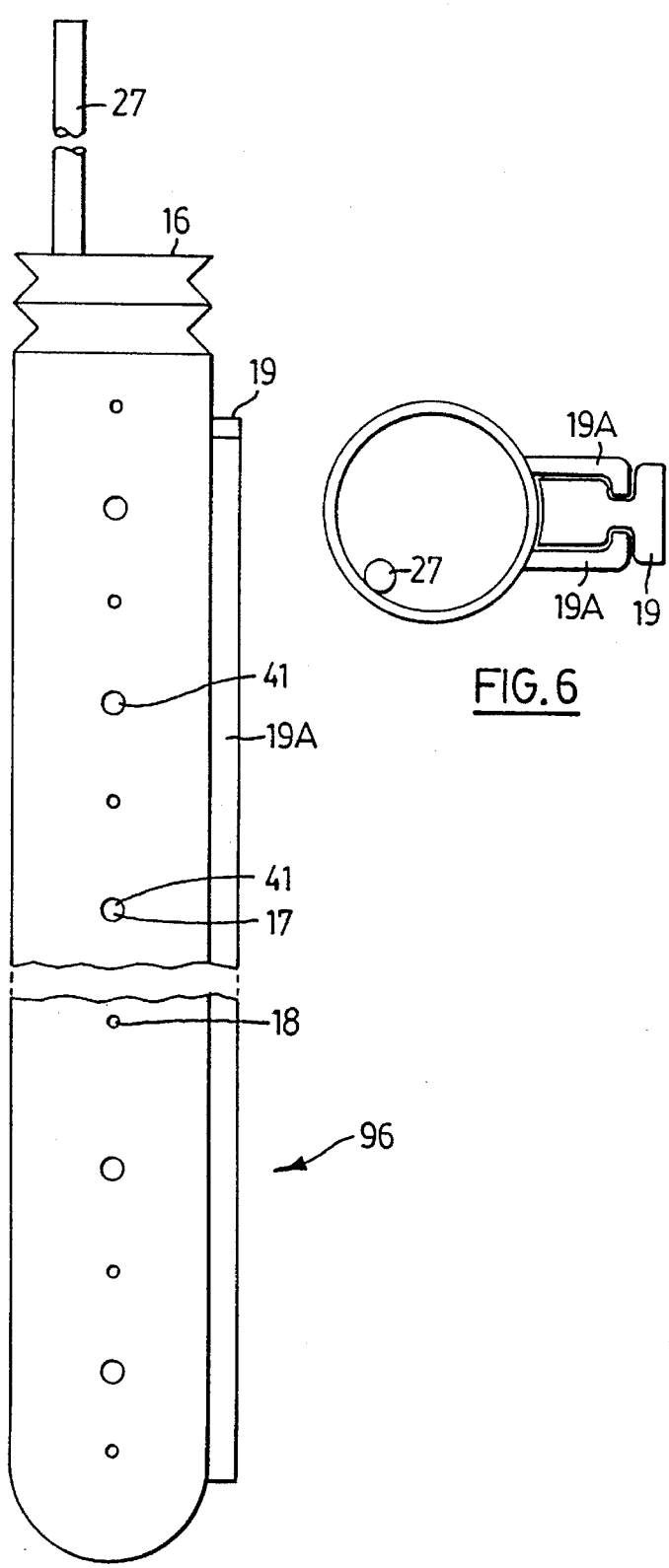
FIG.4  FIG.5  FIG.6

PLANT WATERING DEVICE AND METHOD FOR PROMOTING PLANT GROWTH

BACKGROUND OF THE INVENTION

The present invention is a plant watering device and method for promoting plant growth in arid regions. In one embodiment of the device, a solar powered water condensing unit is used to collect water from the air.

A system is known called drip irrigation where ground water sources can be flow governed for maximization of water use by plants. Drip irrigation is not practical when water sources are not readily available. Further, drip irrigation has a requirement of pressure pumps when water is obtained from levels lower than the drip sites. These pumps require substantial maintenance, piping, and associated power costs, and can lead to increased salt concentrations in the irrigated soil over time.

Methods of extracting water from air are known which employ Peltier units, such as described in patent DE 3936977. This device has the ability to extract water from air but does not provide any device or process to organize the delivery of the water to plants in a manner that would optimize plant survivability in various extreme environmental conditions. Further, the device is powered by solar cells and has no method of operation when solar power is not available. Another device patent, DE 3541645, has the ability to remove moisture from air using Peltier unit cascades optimizing humidity and air flow rate parameters. This patent does not teach a process of predicting and conforming climatic mapping or controlled subterranean water injection to optimize plant growth. RU 2004719 teaches the use of a lithium bromide refrigeration cycle powered by solar energy heated hot water that converts water vapor to liquid water. This system is substantially restricted to operating when solar energy is available and does not provide any process that would optimize plant growth. Further, this system is prone to thermal expansion failure if freezing of the solutions or water should occur, and therefore, cannot be relied upon for extended periods without service.

When a seedling tree is planted in the soil of an area where the water table is at a distance below the ground level, the seedling will require constant watering until such time as the roots have managed to reach an adequate source of ground water, or the seedling will die. This distance can be several feet in arid regions and can take several years to traverse. Since water is generally a precious resource under these conditions, optimization of the delivery of any irrigation water to the plant is essential. Further, the sooner a plant reaches a sustainable source of ground water, the sooner irrigation can be discontinued. Reforestation attempts are currently substantially limited to regions where the existing water table is within a short distance of the ground surface in order for the seedlings to survive without constant watering. Accordingly, this limits the regions in which reforestation is feasible.

There is a need for a device that provides optimal usage of irrigation water in both the sustaining of the plant and in the promotion of tap root growth. The prior art does not teach a method of monitoring both current and historic water vapor conditions, and autonomously and intelligently providing and controlling the water needs of a plant in light of such history.

SUMMARY OF THE INVENTION

It is an object of the present invention to provide a self contained, highly portable, relatively inexpensive, device for the autonomous long-term intelligent irrigation of plants and trees in arid lands throughout the world.

It is a further object of the present invention to provide a device which efficiently distributes irrigation water to a target plant in such a fashion that not only is the maximum usage of water obtained, but at the same time, enhanced tap root growth is effected.

The above objects are accomplished by the present invention which provides a plant watering and root growth enhancement apparatus for use in arid soils. The apparatus comprises a storage receptacle for receiving and storing water, and an elongate water delivery tube having a closed lower end and an open upper end. The tube is insertable into the soil adjacent a plant, and the open end is in flow communication with the storage receptacle. The delivery tube has a plurality of openings spaced along its length to enable the release of water from the storage receptacle into the soil proximate the roots of a plant. Control means coact with the openings spaced along the delivery tube for regulating the quantity of water released from the delivery tube to the roots of the plant at addressable depths.

The invention also provides an autonomous plant watering and root growth enhancement apparatus, comprising: condensing means for condensing atmospheric water vapor to water; a storage receptacle for receiving the water condensed by the condensing means; and a water delivery tube which is insertable into soil adjacent a plant. The water delivery tube has a closed lower end and an open upper end which is in flow communication with the storage receptacle. The delivery tube has a plurality of openings spaced along its length with each opening having an electrically operated valve to allow water to flow from the tube. Moisture sensing means are attached to and spaced along the length of the delivery tube for determining the moisture content in the adjacent soil at various depths. The device has control means comprising an electric power source and a microprocessor for providing fuzzy logic supervised control over the condensing means, the storage receptacle, and the delivery tube. The microprocessor is provided with input from the moisture sensing means spaced along the delivery tube to determine immediate water requirements for the plant. The microprocessor is provided with historical vapor pressure maps from which predictions of future water requirements and thermal stress of the target plant can be made. The control means govern the collection of water in the storage receptacle from the condensing means and the release of water to the plant roots through an appropriate opening of the delivery tube as determined by the microprocessor.

The present invention also provides a process for watering a plant and enhancing the root growth thereof. The process comprises the steps of receiving and storing water in a sealable storage receptacle; inserting into the soil adjacent a plant an elongate water delivery tube which is in flow communication with the storage receptacle, the delivery tube having a plurality of openings spaced along its length; periodically releasing water from the storage receptacle into the soil proximate the roots of a plant through one of the openings spaced along the length the delivery tube; and regulating the quantity of water so released.

The invention also provides a process for watering a plant and enhancing its root growth, comprising the steps of: condensing water from the ambient air; flowing the condensed water into a storage receptacle; adding plant nutrients to the water in the storage receptacle; and periodically releasing nutrient containing water from the receptacle into the soil proximate the roots of a plant in accordance with root growth needs of the plant as determined by soil moisture measurements and local environmental conditions.

The device provides means with which to deliver water to the roots of a plant during critical times in a controlled, efficient and advantageous fashion which promotes deep subsurface root penetration. The device also has the ability to address thermal stress by timed infusions of plant transpiration inhibitors. Beneficially, the device including the condensation means provides distilled water and, as such, use of the device will not lead to increased salt concentrations or other unwanted leachates in the irrigated soil.

The present invention can be tailored in size, and therefore, output capacity, reflecting the desired water requirements of a particular application, and can be used in most agricultural situations now reliant on surface water drip feed systems. The device is designed to last for many years without service as there are few moving parts and power is provided by sunlight.

Other features, advantages, objects and embodiments of the invention will be readily apparent to those skilled in the art from the following description of preferred embodiments taken in conjunction with the claims and accompanying drawings.

BRIEF DESCRIPTION OF THE DRAWINGS

FIG. 4 is a side elevation showing a first side view of the below ground element of the invention.

FIG. 5 is a rotated view of the element shown in FIG. 4.

FIG. 6 is a cross sectional view of the below ground element taken along line 6—6 in FIG. 5.

DESCRIPTION OF THE PREFERRED EMBODIMENTS

The present invention comprises a method of establishing long-term plant growth in dry soils, and an apparatus to effect the method. The apparatus comprises three separate modules which are the storage, delivery, and control modules, with the control module effecting control over the operation of the other two modules. The modules are constructed to be releasably engagable with one another.

Figure 1:
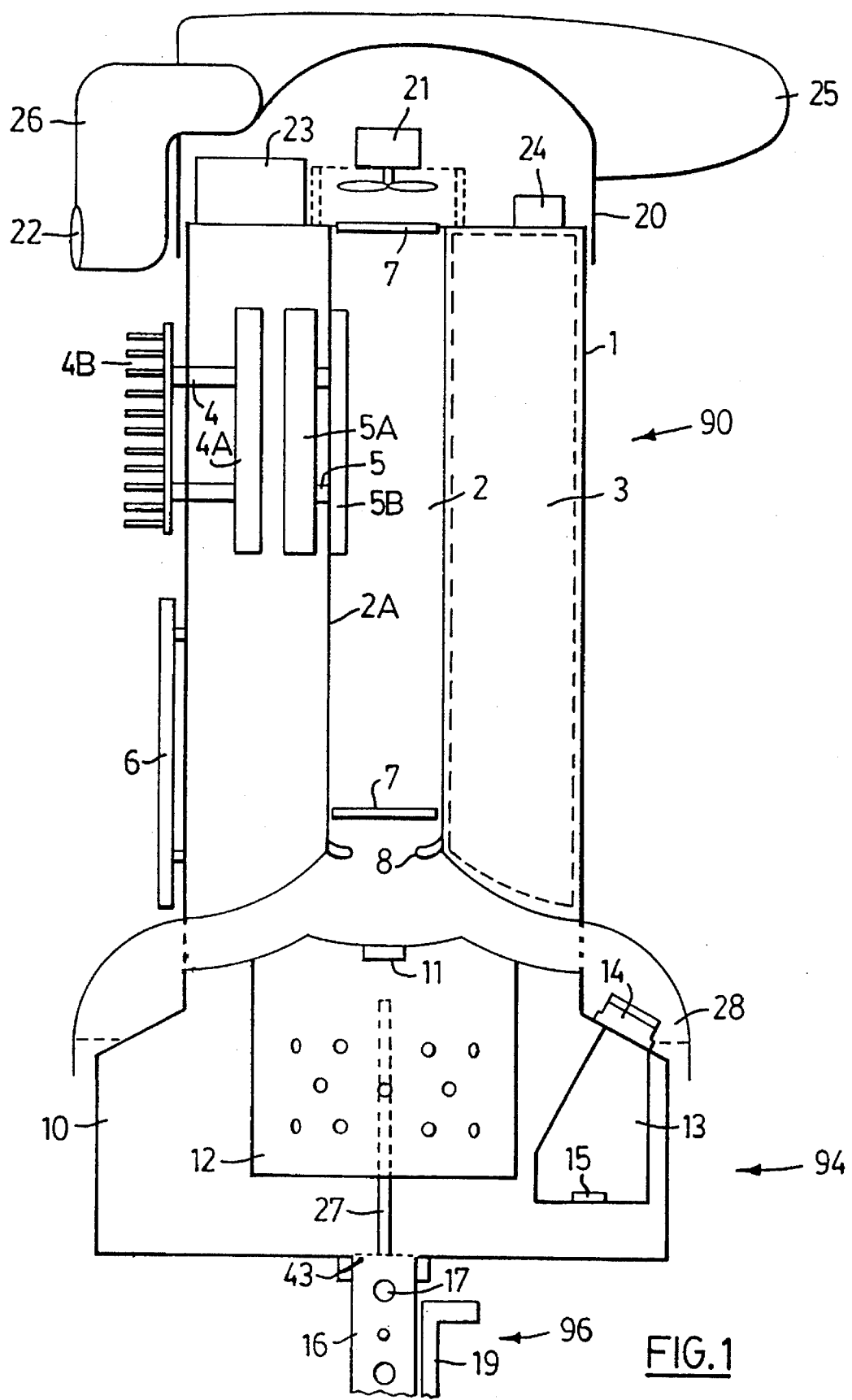
FIG. 1 is a longitudinal cross-section view of a first embodiment of the invention.

As shown in FIG. 1, the water storage module 94 comprises a storage receptacle 10 which has a normally closed electromagnetic valve 11 atop it. The valve 11 is opened to fill the receptacle 10, and otherwise is closed to prevent evaporation of water from it. Disposed within the water storage receptacle 10 is a water level indicator 27, the output of which is directed to the control module 23. The water storage receptacle 10 may contain a perforated basket 12 which can be filled with nutrients appropriate for dissolution in water. The basket 12 is optional in that the device will serve its intended purpose without it, but in certain situations, it may be necessary to supplement soil nutrients by supplying them in this way. The water storage receptacle 10 can also include a dispenser 13 having a fill cap 14 accessible to the exterior of the storage receptacle 10. An electrically controlled normally closed valve 15 is located at the lower end of the dispenser 13 to permit a time controlled release of a chemical agent into the water of the receptacle 10. The dispenser 13 may operate to add an anti-transpirant, such as abscisic acid or its analogs, to the water for uptake by the plant root system at specific times or under particular climatic conditions as determined by the control module 23. The valve 15, like all system valves, is operated under control of the system microprocessor.

Referring now to FIGS. 4 to 6, the water or solution from the storage receptacle 10 is directed to a water delivery module 96 comprising a hollow delivery tube 16 which extends through an opening 43 in the bottom of the receptacle 10. Each delivery tube 16 is disposed in close proximity to the plant being tended. The water delivery tube 16 has a plurality of openings along its length. Each opening 41 has an electrically operated normally closed valve 17. Each opening 41 is provided with a screen or filter (not shown) to prevent fouling of the valve 17 by soil particles. Adjacent at least some of the valves 17 are soil moisture sensing elements 18. In this embodiment, these elements 18 are located preferably somewhat above a corresponding valve 17, but they need not be intimately associated with the delivery means. The elements 18 can be fabricated on an independent carrier which can be located remote from the delivery tube 16 and in communication with the control module 23. The elements 18 can be structured to provide data to a control module, or can provide an output signal to either a visual indicator or to an electrically operated indicator to advise the user of the moisture content of the soil at various depths.

The valves 17 are situated at different vertical elevations which can be chosen to correspond substantially to root growth stages for specific categories of plants. The plants are thus continuously induced to grow roots which chase a progressively deeper supply of moisture as these valves 17 progressively open to lower levels under system program control. This process encourages the plant to maximize its root extension capabilities until the roots reach subsurface ground water resources. The delivery module 96 is constructed to allow ready adjustment in length at installation time so as to best accommodate the species of plant being tended, the root system depth capability, and the depth of the local subterranean moisture supply. The module 96 can be constructed from individual segments joined together at the time of use, or can comprise a predetermined length that is cut to the correct length and the sealed at the bottom end. Those skilled in the art will appreciate the many ways that this module 96 could be fabricated and meet the requirements as specified herein.

Located within the delivery tube 16, and with an extension projecting upward into the storage receptacle 10, is a water depth sensor 27 to provide the control module 23 with a signal indicating the amount of water that is available in storage, and the amount released during each watering session. This sensor 27 can be of the resistance type.

The delivery of water can also be manually controlled by using a manually operating sliding gate 19 which has holes 17A arranged to enable the top down sequential opening of holes 41A spaced along through the wall of the tube 16. The sliding gate 19 is sealingly held against the wall of the tube 16 by an extruded flange 19A within which the gate 19 slides. The slide gate 19 has markings which align with an indicator 19B on the tube 16 to identify the hole 41A that is currently open.

Water can be supplied to the storage module 94 in a variety of ways. For example, a large tank of water may be used to supply a number of storage modules 94 or the modules 94 may be refilled periodically from a tanker truck. In many instances, however, a supply of water for the storage modules 94 will not be so readily available. Thus, in order to provide water for a plant located in a remote region having less than about 50 cm of annual precipitation, the device preferably contains a condensing module to condense moisture from the atmosphere. This condensing module is based on either an electrically powered Peltier unit based system 90 or a thermally powered refrigerant system 92. Either of these condensing modules can be used with the remaining three modules which are fabricated to provide an appropriate interfacing for both.

Figure 2:
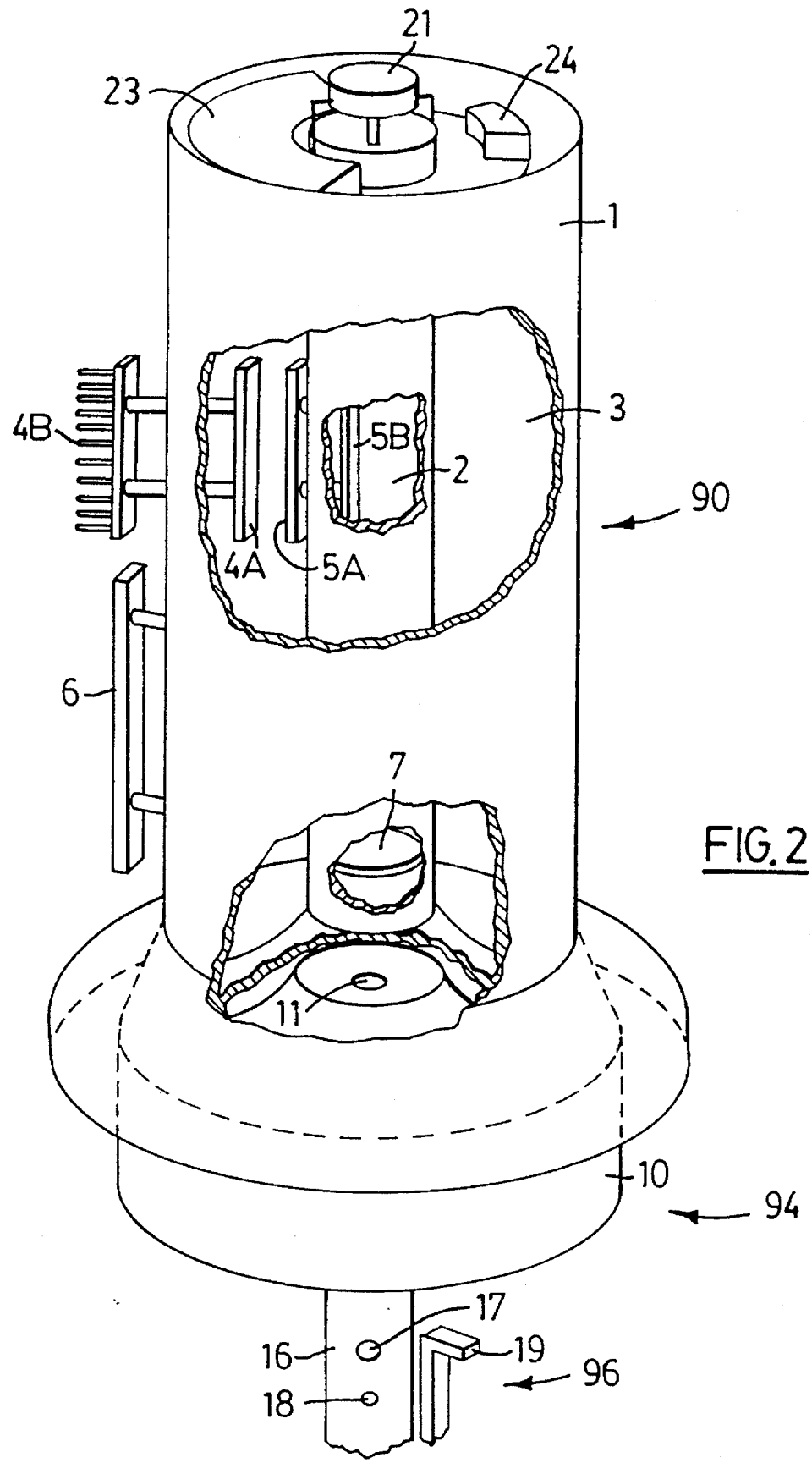
FIG. 2 is a longitudinal cut-away perspective view of the embodiment of FIG. 1.

In one embodiment, as shown in FIGS. 1 and 2, the condensing module 90 comprises a thermally insulated toroidal chamber 1 about a central cylindrical condenser 2 having an inner wall 2A. The toroidal chamber 1 is sealed at both ends and is filled with a refrigerant 3 which provides a heat sink for the condensing module 90. Transecting the exterior wall of the chamber 1, and insulated from the wall, are a plurality of electrically operated thermocouple bridged junctions which form either single or series cascade Peltier units 4. These Peltier units 4 serve to cool the refrigerant 3. The heat absorbing or cold ends 4A of these Peltier units 4, are located within the chamber 1 in conductive contact with the refrigerant 3, and the heat dissipating ends 4B are located outside the chamber 1 in contact with the ambient air. The temperature of the condenser 2 is controlled by means of a plurality of electrically activated Peltier units 5, which transect the wall 2A. The heat dissipating ends 5A of the Peltier units 5 are in the refrigerant 3, and the cold ends 5B protrude into the condenser 2 to cool it.

The Peltier units 4 and 5 are controllably energized by DC current from detachable solar voltaic cells 6 situated circumferentially around the exterior of the chamber 1. These cells 6 are preferably positioned to benefit from cooling provided by the convection current created by the radiating heat of the Peltier unit ends 4B. Alternatively, the solar cells 6 can charge a battery 35 (FIG. 7) which in turn powers the Peltier units 4 and 5 during the night. Further, the Peltier units 4 or 5 can be driven by a remote electrical source (not shown) which may be capable of driving several condensing modules 90.

The refrigerant 3 is chosen to have a high thermal storage capacity and further selected to be substantially maintenance free, non-toxic in case of containment breach, low cost, and readily obtainable. The refrigerant 3 can also be of the type capable of storing both thermal and electric energies. The use of a refrigerant capable of storing an electric charge can reduce the size of battery required. The refrigerant 3 provides the device with a controllable thermal cold charge which is used as a driving force for battery operated Peltier units 5 when no solar voltaic electrical charge is available, and when the Peltier units 4 are not in operation. This feature allows condensation to proceed when immediate vicinity surface vapor levels are favorably high, such as in the early evening or just before dawn when light levels are low. When the Peltier units 4 are not actively cooling the refrigerant 3, a small sinusoidal waveform is applied to them by the control module 23 to prevent them from acting as thermal conductors.

Valves 7 are disposed respectively at the top and bottom of the condenser 2. The valves 7 are controllably closed or opened at appropriate times depending on the temperature of the refrigerant 3, the temperature of the condenser 2, condensation or dew point parameters and related climatic factors. Both valves 7 are in a normally open position allowing the moisture laden air that is to be cooled to flow through the condenser 2.

Temperature sensors (not shown) on the condenser wall 2A provide information to the control module 23, which signals the Peltier units 5 to reduce the temperature of the condenser 2 to a specific level below the dew or condensation point of the surrounding ambient atmospheric water vapor. At the optimum condenser temperature, water vapor will condense on the walls 2A and flow downwardly. The diameter of the condenser chamber 2 relative to the general dimensions of the refrigerant-containing toroid chamber 1 is such that the ability of the Peltier units 4 to remove sufficient heat from the refrigerant 3 is not compromised by a too large natural thermal loss from the condenser wall 2A. The preferred diameter of the condenser 2 is a function of the available DC current, the efficiency and number of Peltier units 4, and the comparative cold sink and heat sink parameters of the refrigerant 3. Surface area of the condenser wall 2A can be provided with a substantially increased surface area by employing a corrugated surface, or by introducing a corrugated tubular section that is operatively supported by contact with the centrally directed faces of several Peltier units 5. Once formed, the condensate is directed by gravity down the wall 2A and over a restricter 8 disposed circumferentially around the lower end of the condenser 2. The restricter 8 directs the water to the water storage module 94 disposed below the condensing module 90. It is desirable for the restricter 8 to be disposed in such fashion as to allow the condensate to be directed to a water storage receptacle 10 of the module 94, but yet to allow relatively unimpeded air movement through the condenser 2.

The air entering the top leaves the condenser 2 from the lower end through a modulated hollow skirting 28 that encircles the top part of the water storage module 94 and directs air down the side of the storage receptacle 10. This skirting 28 extends down the side of the water storage receptacle 10 sufficiently to prevent heavy particulates from entering the condenser 2. The skirting 28 may also be provided with screening (not shown) to prevent the ingress of insects and small animals into the device.

Figure 3:
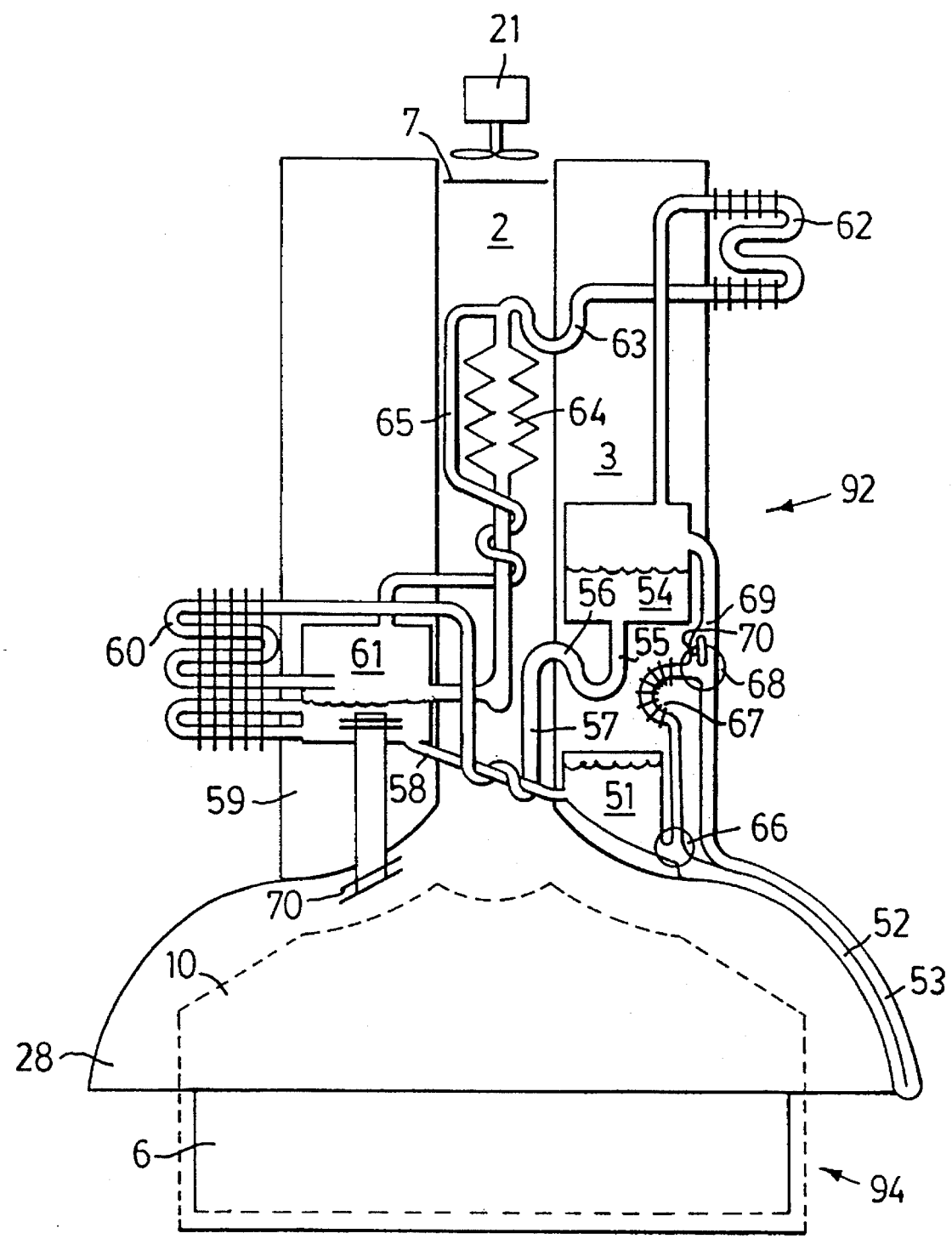
FIG. 3 is a schematic longitudinal cross-section view of an alternative embodiment of the invention.

In a second embodiment, schematically illustrated in FIG. 3, a condensing module 92 effects condensation by means of a thermally powered pressurized absorption cycle. The construction of this embodiment is preferably effected to allow it to be interchangeable in use with the module 90. To this end, the module 92 is preferably toroidal in shape. The condensing module 92 is provided with two working fluids, a refrigerant and an absorbent, such as ammonia and water, along with a gas such as hydrogen acting as a pressure balancing agent. The system used here employs hydrogen on the low pressure or weak solution side of the system to balance the pressure from the high pressure or strong solution side. The system has no moving parts except for an air moving fan 21, air flow control valves 7, and valves 66 and 68 which direct the flow of solution. While absorption refrigeration systems of this type are well known, the following is a description of such a system as applied to the condensation module 92 of the invention. The basic absorption refrigeration system is modified in the present invention in that a refrigerant 3 in the chamber 1 is provided which acts as a heat sink and can be selectively charged to a temperature substantially above ambient in order to power the absorption cycle when solar energy is not available.

A strong solution of, for example, ammonia and water flows from a generator tank 51 down through generator channels 52 and absorbs heat from solar energy as it flows upwards in heating channels 53. The generator channels 52 and the heating channels 53 are insulated from each other so that the strong solution is only heated in the channels 53. The external surfaces of the channels 53 have a finish chosen to maximize the absorption and transfer of solar radiation to the strong solution. The generator channels 52 and the heating channels 53 are formed essentially as radially directed upright extending tubes. As the strong solution absorbs heat while passing through the heating channels 53, a portion of the ammonia is vaporized. This vaporization causes slugs of solution to be carried upwards creating a percolation effect in the heating channels 53 with the percolating ammonia bubbles enhancing the system flow.

The solution flows through a channel 69 into a separator 54 where the now weak solution is directed back towards an absorber 61. The weak solution flows back to the absorber 61 through a liquid U-tube trap 56 and a return line 57, transferring heat to a line 58 by a heat exchanger 59. The transfer of heat to the line 58 increases system performance. The weak cooled solution proceeds from the heat exchanger 59 through an external air cooled heat exchanger 60 and then enters the air cooled absorber 61. The absorber 61 is thermally insulated from the containment refrigerant 3 to enhance system efficiency.

The pressurized vaporized ammonia that leaves the separator 54 passes directly to an air cooled condenser 62, where it is condensed. The now liquid ammonia drains from the condenser 62 by gravity through a U-tube trap 63 into an evaporator 64, where it is vaporized by combination of lower pressure and the absorption of latent heat from the air flowing through the condensation chamber 2. As the evaporator 64 is cooled down to the dew point, condensation forms which flows by gravity into the water storage receptacle 10, as described. The shape of the evaporator 64 is chosen to provide the optimum condensation surface area. The ammonia refrigerant vapor, along with some of the hydrogen gas balancing agent passes from the evaporator 64 to the absorber 61 where the ammonia goes into solution with the water absorbent, thus reforming the strong solution, creating a reduction in pressure. The pressure balancing gas which has no significant solubility in water, passes through the absorber 61 and returns to the evaporator 64 via a return line 65. The strong solution from the absorber 61 is returned via the line 58 to the generator 51. The purpose of the two U-tube liquid traps 63 and 56 is to contain the pressure balancing hydrogen gas in the evaporator 64 and the absorber 61, thereby preventing migration of the gas to the generator 51, separator 54, and condenser 62. As the skilled person will appreciate, the pressure differential across the system allows the ammonia to transfer heat through the process of vaporization and condensation.

The now cool and dehumidified air flowing out the lower valve 7 contacts radially disposed heat exchangers 71 which are insulated from the refrigerant 3. The heat exchangers 71 transfer heat from the absorber 61 to the cool exhaust air. The air leaving the device also cools the solar panels 6 which are located on the exterior surface of the storage receptacle 10.

The relative strength of the weak solution in the absorber 61 is determined by the valves 66 and 68 which control the amount of heat being transferred from the generator tank 51, the generator channel 52, and the heating channel 53. These valves 66 and 68 are provided in moulded casings having appropriate fluid connections. The casings are an integral component of the overall system, and are service accessible. The valves 66 and 68 are preferably of either the rotary valve or plunger valve type, and are magnetically operated. The valve 66 controls flow between the generator tank 51, an internal heat exchanger 67, and the channel 52. The valve 68 controls the flow between the channel 53, the internal heat exchanger 67, the channel 69, and a vapor bypass channel 70.

The generator 51, the absorber 61, and the separator 54 essentially comprise toroidal chambers vertically disposed within the toroidal chamber 1 and are interconnected to effect gravity fluid transfers. Both the generator 51 and the absorber 61 are thermally insulated from the refrigerant 3. The interconnections between chambers, and the connections to both internal and external heat exchangers will be either insulated or non-insulated as standard thermal engineering efficiency practice dictates. The materials chosen for construction, and the refrigerant, absorbent, and gas balancing agent for the cooling cycle are chosen according to standard thermal engineering practice taken in light of the present teaching.

There are situations were the possibility of a containment leak from the absorption cycle is not permissible and, in these cases, the Peltier cycle module 90 is the preferred embodiment to use even though its efficiency is less. In those situations where a limited containment leak can be tolerated, the absorption type module 92 is preferred.

Common to both the Peltier and absorption cycle embodiments of the condensing module, a fan 21 is mounted at the top of the condenser 2 serving to direct air down through the condenser 2 at controlled flow rates for maximizing condensation within given system parameters. The air which enters the condenser 2 from the top will flow without the fan operating due to the convection potential of warm and cold air displacement, but the flow will be at a less than optimum rate. Air flow through the condenser 2 is further augmented by a pivotal dust cap 20 atop of the device which by wind pressure on a wind vane 25 positions a funnel 22. The funnel 22 provides flow communication with an air inlet 26 to direct inflowing air horizontally, then upwardly and horizontally, thus preventing heavy particulates from entering the device. The wind vane 25 serves to keep the inlet 26 directed toward a wind source, thus taking advantage of morning and evening thermal currents.

While for illustration purposes these embodiments show the condensing module disposed over the water storage module 94, the condensing module and the storage module can be operated at a distance from each other if appropriate means of fluid connection are provided. The ratio of the water storage chamber capacity to the condensing module size is determined according to the conditions of the region in which the device is deployed. Power supply for, and control over, the condensing, storage, and delivery modules can also be effected remotely as will be apparent to those skilled in the appropriate art. Further, while indicated herein as being toriodal and having only one passage for the condensation of water, this is for example and is not limiting to the teaching herein. The chamber 1 can be, for instance, oblong in shape and have a plurality of condensers 2 disposed within it. Those skilled in the art will appreciate the factors which would need to be adjusted for satisfactorily working with such an embodiment.

Figure 7:
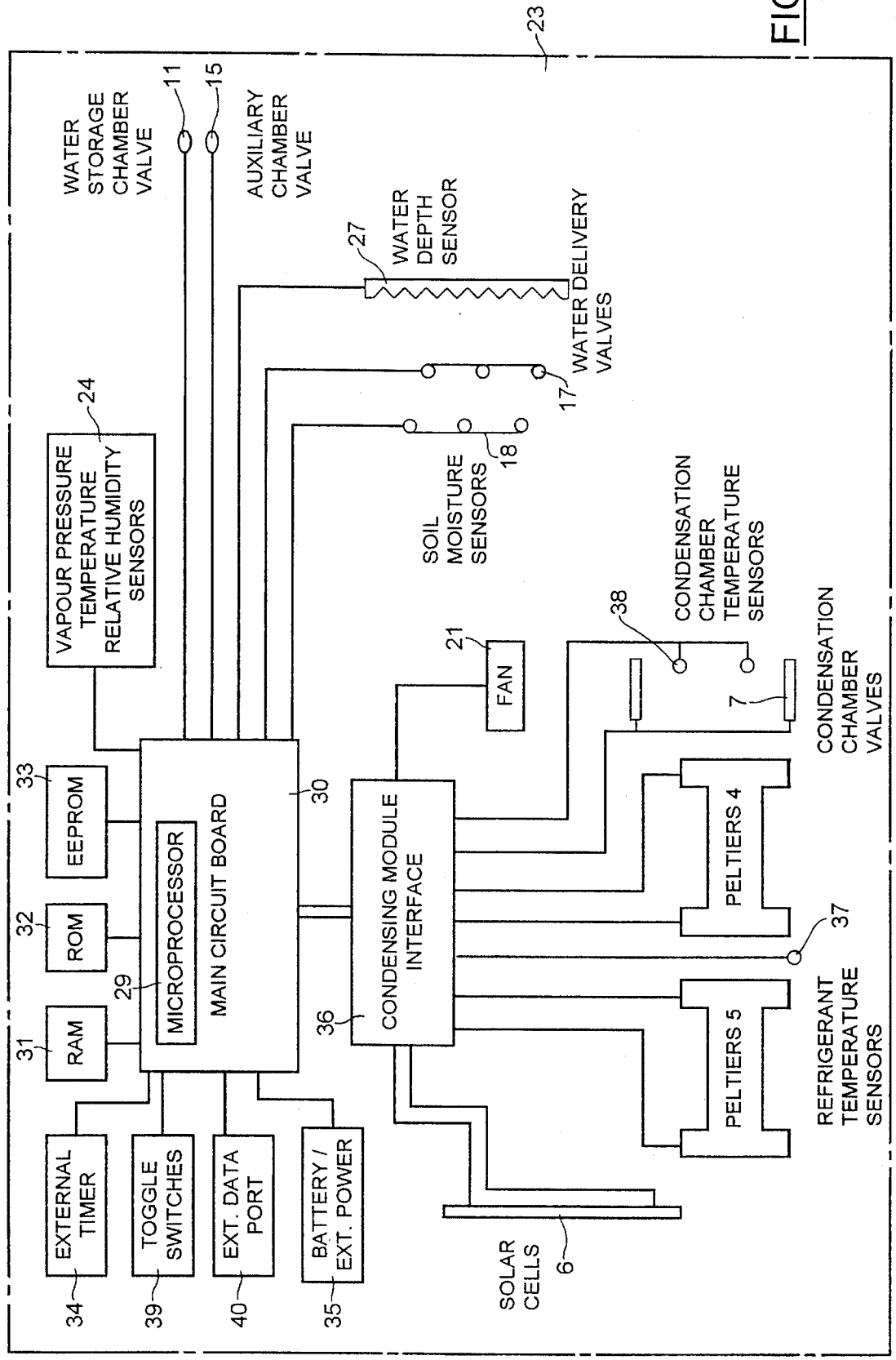
FIG. 7 is a schematic of the control, sensing and power system of the invention.

FIG. 7 is a schematic representation of the control module 23 of the present invention. As shown in FIG. 1, the control module 23 may be located at the top of the device; however, the placement of the control module 23 is not restricted to this location.

The operation of the other modules of the device is controlled and monitored by a microprocessor 29 utilizing "fuzzy" logic. The microprocessor 29 and its associated support circuitry is, disposed on a main circuit board 30 with associated hardware of the control module 23. A RAM 31 for a daily tasking scratchpad and a ROM 32 for module interfacing and basic operating routines are provided, as is an EPROM/EEPROM 33 for database updating purposes. Further, a system programmable timer 34 provides external control over power, timing signals and date functions. External control over power allows the control module 23 to program a set number of sleep hours, thereby conserving a battery 35. The control module 23 is provided with voltage regulating, battery monitoring and charging facilities. Battery charging is provided by solar cells 6. A low battery signal is provided, whereby the controller program can enter a preservation mode overriding primary and auxiliary command profiles.

Via the condensing module type interface 36, the control module 23 obtains input from temperature sensors 37 for the refrigerant 3, and from temperature sensors 38 for the condensation surface temperatures. Toggle switches 39 provide field alterable data regarding the target plant, while an external data port 40 permits data to be downloaded to the device.

The microprocessor 29, under fuzzy logic program control, develops and maintains primary and auxiliary command profiles to supervise daily functioning. Primary command profiles are directed to the establishment and maintenance of the most efficient operation of the condensing module type to extract atmospheric moisture on a daily basis, and for the best time to water the plant on a daily basis. Auxiliary command profiles are directed to projecting periods of reduced atmospheric moisture availability or increased plant water demand, as well as controlling the release of water and other nutrients, to ensure long-term plant survivability. Information derived from a combination of vapor pressure, temperature, and relative humidity sensors 24 is combined with input from the soil moisture sensors 18, and is used to build up a data base of local environmental information. The data base also comprises preferred operating conditions relative to given ambient conditions. The data base allows the device to tailor optimum ground moisture conditions for survival of the plant and subsequent plant growth.

Primary command profiles address the most appropriate time to water the plant, thus obtaining the maximum plant absorption rates, with the least surface evaporation losses to the atmosphere. Primary command profiles determine, inter alia, whether or not the device should enter the condensation mode, air fan rotation speeds for optimum vapor contact on condensation surfaces, as well as condensation surface temperatures to prevent freezing of the condensation to the surface. In order to facilitate field updating of data or program code, the microprocessor 29 is provided with an extended data port 40 for input of data from either another device or a keyboard. Data about local environmental information can be downloaded from the device thereby assisting in creating more accurate local environmental maps.

The decision making of the fuzzy logic control program is guided by a combination of information from the data base, from acquired real-time data, and from target plant information encoded by means of toggle switches 39. The fuzzy logic programming allows the controller 23 to continuously adapt the functions of the device to changing environmental and plant conditions. Those skilled in the appropriate art will appreciate those aspects required for the construction of the controller program, other than those specifically discussed herein, which are necessary for the operation of the program to effect control of the invention as outlined herein.

Initial yearly atmosphere vapor charts are prepared from historical data for the location that the devices are to be used in. By means of its data port 40, the device can receive information such as the local yearly vapor chart, and the precise geographical location of the device with respect to the yearly vapor chart, with this data being stored in the rewritable ROM 32. Precise geophysical location data can also be obtained and downloaded to the device from a Global Positioning Satellite System device. Alternatively, both the local yearly vapor chart and the location data can be loaded at the site, or preloaded at the factory.

The yearly vapor chart wave form will be at its lowest levels on either side of the hottest period of the year. Shown below is a vapor profile map for Ladner, Wyo.:

| Month | J | F | M | A | M | J | J | A | S | O | N | D |
|---|---|---|---|---|---|---|---|---|---|---|---|---|
| Vapour Pressure | .08 | .10 | .11 | .12 | .20 | .25 | .30 | .25 | .18 | .11 | .09 | .09 | which shows that peak vapor pressure occurs in July. As a comparative analysis, El Paso, Tex. has the following profile:

| Month | J | F | M | A | M | J | J | A | S | O | N | D |
|---|---|---|---|---|---|---|---|---|---|---|---|---|
| Vapour Pressure | .13 | .12 | .13 | .14 | .19 | .30 | .40 | .35 | .21 | .19 | .13 | .12 |

The microprocessor comparison of the current date and current conditions relative to stored yearly vapor chart readings allows the device to produce a watering strategy that optimizes the use of the available water supply. The mid-summer peak of high absolute humidity will drop to lower levels in cooler seasons. The time of greatest water requirement for plants corresponds to the time of highest atmospheric moisture content.

Yearly moisture requirement profiles of the target plant type are recorded by means of a bank of toggle switches 39 or equivalent setting means. While the switches 39 can normally be set at the device production facilities for site/plant specific applications, they can also be field set to accommodate virtually any plant variety. An example of the information that can be found encoded by the toggle switches 39 is as follows:

Switch number:

1 Species root type—tap root or fibrous

2 Plant cycle—annual or perennial

3 Planting time—spring or fall (for agricultural deployment only)

4 Germination moisture levels

5 Moisture saturation yes/no

6 Intermediate growth ground moisture level

7 Moisture depth control (a) : open only (a)

8 Moisture depth control (b) : open (a) then later (b)

9 Moisture depth control (c) : open (a) then later (b) then later (c)

10 Surface temperature: if too hot, analog anti-transpirant injection

The interpretation of the yearly vapor chart and toggle code allows for a very broad and exact response for individual species requirements. The plant watering control interpretation is augmented by ground moisture readings as well as surface temperature readings.

The control module 23 has the further ability to forecast future water requirements of the target plant by utilizing the yearly vapor chart. During field use, the control program modifies the yearly vapor chart by incorporating the current readings into the historical map, thereby providing itself with a more accurate forecasting capability.

Secondary functions address a yearly climatic cycle and allow the device to optimize performance using the variation in atmospheric vapor levels and plant and ground surface evaporation rates as control function indicators. For example, by means of the historical yearly vapor pressure map, and its own adjustments thereof, the device can determine that "August" (Northern Hemisphere) historically has high atmospheric moisture conditions resulting in high condensation rates for the device, and it can accordingly saturate the ground in June/July and sparingly water the plant with stored water in August. Further, should insufficient water be stored to provide all predicted requirements, the device can release to the root system, by means of the valve 15, predetermined amounts of abscisic acid or analog thereof from the dispenser 13 to induce a partial stomata closure in the target plant, and subsequently, reduce the transpiration rate of the plant. This feature enables minimalization of the water consumption of the plant, and the avoidance of possible heat stress to the plant from the lack of water.

The device has several operating modes, some of which can occur simultaneously depending on circumstances. The following is a description of the operating modes of the device including a condensation module.

In operation, the controller program is activated by the external timer, and enters the sense mode. The program then proceeds to determine the remaining battery power, the DC current from the solar cells 6, and to determine if there is sufficient power capacity to operate the various module sensing systems. If these power requirements cannot be met, the program then sets the external timer 34 for the elapse of a predetermined time period, and directs the control module 23 to assume the sleep mode until again activated by the external timer. Upon meeting minimum power requirements, the device proceeds to take vapor pressure, temperature, and relative humidity readings, determines the amount of water in storage, and obtains soil moisture and refrigerant temperature readings.

If the amount of power available is sufficient, and the sensors determine that watering is required and that there is stored water available, the device proceeds with the watering mode. This function is described in greater detail below. Should watering not be required, available electrical energy is directed to the primary command mode of the device.

The primary command mode is referenced to the input of solar energy into the system. The primary command mode begins by obtaining information regarding the condensing module type from the condensing module interface 36 which identifies type and size. Depending upon which condensing module type is present, and the current conditions, different modes of operation are effected. When conditions fall outside the parameters for the primary command mode, the device drops into the auxiliary command mode or the null mode. The auxiliary command mode is in effect when energy is available but conditions do not meet those required for the primary command mode operation.

The null mode is essentially a sleep state wherein the device expends minimal energy and waits for the next external timer wakeup.

During condensation, condensation control functions are activated. These functions comprise monitoring air flow speed through the condenser 2, ambient atmospheric temperature, condenser temperatures, and storage chamber readings.

In the absorption cycle condensation embodiment, the primary command mode is to store solar energy by heating the internal heat sink 3. In this embodiment, the valve 66 stops the flow of the strong solution from generator tank 51, and connects the fluid flow from heat exchange 67 to the channel 52. The valve 68 directs the fluid flow from channel 53 to the heat exchanger 67, which serves to heat the refrigerant heat sink 3, and prevents a liquid flow to the channel 69. Vapor from the channel 53 is allowed to flow through the bypass channel 70 to the channel 69. The then weak solution, without entrained vapor, recirculates through the heat exchanger 67, the generator channel 52, and the heater channel 53, thus heating the heat sink 3. Supplemental fluid is supplied to the system from generator tank 51 if liquid volume is reduced. Electrical power from the solar cells 6 charge the system battery 35.

Should the temperature of the heat sink 3 reach a predetermined point, additional solar thermal energy flow is directed by the primary command subsidiary mode. In this mode, the valve 66 directs the flow of strong solution from the generator 51 to the channel 52 and closes the line from the heat exchanger 67. The valve 68 permits the fluid to flow from the channel 53 to the channel 69 and closes the line to the heat exchanger 67 and the bypass 70. This arrangement directs the device to stop storing energy and to go into the condensation mode. A safety pressure valve (not shown) directs excessive ammonia refrigerant pressures to a capture tank (not shown) or permits it to be blown off to the environment, should the primary command subsidiary mode fail to be effected.

The auxiliary command mode of the absorption cycle embodiment is that of condensing water, which is preferably effected at night since a lower ambient external air temperature requires less overall temperature reduction of the evaporator 64 to achieve the dew point, and is powered by the energy stored in the refrigerant heat sink 3. In the auxiliary mode, the valve 66 directs the fluid flow from the generator tank 51 through the heat exchanger 67, and prevents fluid flow to the channel 52. The valve 68 permits fluid flow from the heat exchanger 67 to the channel 69, and prevents flow from the channel 53. This arrangement avoids radiant heat losses from occurring in the channel 53 when the device is using stored energy. Initial conversion efficiency of solar thermal energy into the absorption cycle system can approach 80% or more of theoretical system efficiency. This embodiment requires the battery 35, which is charged during the primary command mode, for operation of the control module 23, the valves 66 and 68, and condensation control functions during the night.

The null mode of the absorption cycle is the prevention of fluid flow in the device.

In the Peltier based embodiment, the primary command mode is to apply available power to the Peltier units 5 to drop the temperature of the condenser surface 2A to below the dew point, thus effecting condensation. As noted above, the primary command mode also comprises monitoring air flow speed through the condenser 2, ambient atmospheric temperature readings, condenser temperatures, and water storage chamber readings while condensation occurs. Power is also routed to the battery 35 for charging. When conditions occur that solar energy surplus to that required to effect the primary mode is available, this energy is directed to the primary command auxiliary mode. In this mode, power is also directed to the Peltier units 4, thereby dropping the temperature of the refrigerant 3 (heat sink).

The secondary command mode for the Peltier based embodiment directs power to the Peltier units 4 to drop the temperature of the internal refrigerant 3 temperature for later use.

The null mode constitutes a small sine-wave signal applied to the Peltier units which serves to prevent thermal conduction through them. The Peltier based embodiment may also comprise auxiliary batteries. In this situation, if conditions warrant, i.e., low refrigerant temperature, high battery charge, and low ambient air temperatures, these batteries, in combination with the refrigerant 3, can power a heat transfer to the internal heat sink of the Peltier units 5, thus effecting condensation.

The Peltier based embodiment has an initial disadvantage in that solar cells currently have an approximately 18% solar energy conversion efficiency. If the Peltier based condensing module 90 is powered by an external power supply and not by the solar cells 6, the device can operate in the region of 80% of theoretical system efficiency.

The watering mode of the device comprises testing the moisture content of the soil by means of the electrical resistance sensors 18 disposed on the outer surface of the water delivery tube 16, and providing sufficient water from storage 10 to maintain a targeted level of soil moisture.

Prior to any implementation of the daily watering mode, the device on original setup tests the soil moisture level by reading each of the soil moisture sensors 18, and storing these values in memory in an absorption rate profile. The device then opens the uppermost of the water release valves 17 for a predetermined time period allowing a predetermined amount of water to flow out to saturate the soil in the immediate vicinity of the device. The amount of water released is measured by the water depth gauge 27. This procedure is carried out for each one of the valves 17 in order. At predetermined intervals, the controller 23 checks the readings of each of the sensors 18, and stores these values in memory. This procedure is repeated until the readings from the sensors 18 reach a predetermined base value (pre-watering) or 24 hours have elapsed since the start of the procedure. This system check is repeated several times a day, starting the procedure 3 hours later each day. This variance allows the soil water absorption rate testing procedure to accommodate variations in surface climate conditions. Should the device encounter a significant sharp departure from the previous readings, it will assume that a rain has occurred, and not proceed with the testing again until levels have returned to the pre-departure range.

Upon completion of soil absorption testing after approximately five days, a data base of timed soil moisture absorption rates is established. From this point, the device can determine on future readings of absorption rates, if the absorption rate is higher than the established values. An absorption rate higher than normal indicates a foreign element, which might be a root system absorbing additional quantities of moisture from the ground. The device can accordingly compensate for the additional water requirement.

By performing single tests on the various valves and comparing absorption rates from the different sensor levels to established absorption rate profiles, the device can detect root growth. The device can then force root growth by releasing water at increasing depth levels drawing the roots to lower subsurface levels where a higher probability of naturally present subsurface moisture supplies may exist. Thus, the device is capable of greatly enhancing the survivability of a plant in arid or semi-arid conditions.

While shown herein as being a singular device, a singular control module 23 can be used to effect control over several remote devices each comprising a condenser, water storage, and delivery modules. Such modifications to the basic circuit are within the scope of the present teaching.

Described hereinabove is the preferred embodiment of the device which is directed to applications such as forestation and greening of arid regions and desert areas. Crop trees such as date and olive can be induced to grow in regions previously unsupportive during initial tree growth stages.

It is recognized and appreciated that several aspects of the device as presented can be considered optional to a basic working device. For example, the invention may be used for watering crops or other plants, in which case many of the advanced features described herein may not be needed. In this respect, given that the device is operated without a condensing module, the control module functions thusly directed are obviated. The device can also be operated without the predictive aspects discussed earlier. In these types of cases, the device still provides highly efficient use of irrigation water, and still provides enhanced root growth capabilities. In these cases the fuzzy logic programming can be replaced by standard logic control functions.

Further, one of the preferred methods of deploying the present invention is as follows.

Reforestation areas are selected which are expected to exhibit reasonably stable earth conditions over the foreseeable future. New growth areas are correspondingly appropriately chosen. A plant site is determined, and two bore holes of an appropriate diameter are located a predetermined distance with respect to each other based upon ambient conditions. In one bore hole is placed the delivery means of the device of the invention. The other bore hole is disposed generally beneath the target plant, and is provided with a liner. The liner extends from substantially from the bottom of the bore hole to a point somewhat beneath the seedling root ball at planting time.

The bore hole liner comprises a semi-permeable shell containing therein a nutrient-containing, microbial environment which is released during the vertically downward travelling biodegradation of the liner over several years, once in contact with water. The liner has disposed on its exterior, a contiguously readable moisture sensing means 18 in communication with and remote to, a control associate 23. The nutrient/microbial environ-forming composition is directed to an optimized, species-directed analysis with respect to the target plant. The organic components can be chosen to be of general assistance to a local environ, or be directed to compensating a known ambient condition of the site.

Formation of the bore and delivery of the lining can be effected by a sheathed corebar using a sledge, subsequent withdrawal of the core and replacement thereof by the lining. Withdrawal of the sheath may be effected by a "T" shaped rod upon which the sheath retraction grippage is located. The sheath is flexibly attached to a semi-circular space frame, the exterior of which is geared, the "gear" being slotted to permit the travel of the flexible coupling means, thus permitting axially upward withdrawal force at all times.

This bore hole formation will induce a soil type based upward shift of the local water table and provide a life-form enriched region. Water provided from the device of the invention would be drained by the lined bore hole region. The lateral permeation of water through the soil will be effected by the soil conditions but should generally allow reasonable lateral travel. This should further serve to increase the elevation of the local water table between the two bore holes and enlarge the diameter of the upwelling thereof.

Thus, the use of the invention in conjunction with such techniques should ensure the long-term stability of the local region local as the water table is naturally upwardly drawn in the presence of trees. Such a complimentary method of applying the device of the invention enhances the center-directed watering aspect of the device in its maintenance of the life energy and training of the tap root system. It further provides a life sustaining region for the plant at a relatively low material cost, and requires no advanced or heavy equipment for installation.

The described method can be further augmented by applying a slow release nutrient bearing fabric laid radially about the tree to anchor the earth.

While the foregoing represents one of the preferred methods for using the invention, it is appreciated that other methods will be apparent to the skilled user.

I claim:

1. A plant watering and root growth enhancement apparatus for use in arid soils, said apparatus comprising:

a storage receptacle for receiving and storing water;

an elongate water delivery tube having a closed lower end and an open upper end, the tube being insertable into the soil adjacent a plant, and the open end being in flow communication with the storage receptacle, the delivery tube having a plurality of openings spaced along its length to enable the release of water from the storage receptacle into the soil proximate the roots of the plant; and control means coacting with the openings spaced along the delivery tube for regulating the quantity of water released from the delivery tube to the roots of the plant at addressable depths, said control means comprising an elongate gating member slidably affixed to the delivery tube and disposed in sealing relation over the openings along its length, whereby sliding of the gating member allows the release of water from one opening at a time; and markings on the delivery tube which align with indicators spaced along the gating member to identify the opening from which water is flowing and its relative depth.

2. An apparatus as claimed in claim 1, further comprising:

moisture sensing means adjacent to and spaced along the length of the delivery tube for determining the moisture content in adjacent soil at various depths.

3. An apparatus as claimed in claim 1, further comprising:

a valve atop the storage receptacle which may be opened to introduce water into it; and a container for the storage and release of water soluble plant nutrients, which container is positioned within the storage receptacle.

4. An apparatus as claimed in claim 3, wherein the container is a perforated basket.

5. An apparatus as claimed in claim 3, further comprising a dispenser attachable to the storage receptacle, the dispenser allowing the controlled release of plant anti-transpirants into the water of the storage receptacle.

6. An apparatus as claimed in claim 5, wherein the dispenser is located within the storage receptacle, and the dispenser has a lower end portion with a valve to enable the dispensing of anti-transpirants into the water of the storage receptacle.

7. A process for watering a plant and enhancing the root growth thereof, the process comprising:

receiving and storing water in a sealable storage receptacle;

inserting into the soil adjacent a plant an elongate water delivery tube which is in flow communication with the storage receptacle, the delivery tube having a plurality of openings spaced along its length, an elongate gating member slidably affixed to the delivery tube and disposed in sealing relation over the openings along its length, whereby sliding of the gating member allows the release of water from one opening at a time, and markings on the delivery to be which align with indicators spaced along the gating member to identify the opening from which water is flowing and its relative depth;

periodically releasing water from the storage receptacle into the soil proximate the roots of the plant through one of the openings spaced along the length the delivery tube; and regulating the quantity of water so released.

8. An autonomous plant watering and root growth enhancement apparatus, comprising:

condensing means for condensing atmospheric water vapor to water;

a storage receptacle for receiving the water condensed by the condensing means;

a water delivery tube being insertable into soil adjacent a plant, the tube having a closed lower end and an open upper end which is in flow communication with the storage receptacle, the delivery tube having a plurality of openings spaced along its length with each opening having an electrically operated valve to allow water to flow from the tube;

moisture sensing means attached to and spaced along the length of the delivery tube for determining the moisture content in the adjacent soil at various depths; and control means having an electric power source and a microprocessor for providing fuzzy logic supervised control over the condensing means, the storage receptacle, and the delivery tube, wherein the microprocessor is provided with input from the moisture sensing means spaced along the delivery tube to determine immediate water requirements for the plant, the microprocessor also being provided with historical vapor pressure maps from which predictions of future water requirements and thermal stress of the target plant can be made, the control means governing the collection of water in the storage receptacle from the condensing means and the release of water to the plant roots through an appropriate opening of the delivery tube as determined by the microprocessor.

9. An apparatus as claimed in claim 8, wherein the condensing means comprises:

a thermally insulated chamber having exterior walls and interior walls defining a condenser extending centrally through the chamber, the condenser having open upper and lower ends, and the chamber containing a high thermal capacity heat sink solution;

a first electrically activated Peltier unit transecting the exterior chamber wall and being insulated from it, a heat radiating end of the Peltier unit extending outside the chamber and a heat collecting end of the Peltier unit extending into the chamber in conductive contact with the heat sink solution;

a second electrically operated Peltier unit transecting the interior chamber wall and being insulated from it, a heat collecting end of the Peltier unit extending into the condenser and a heat radiating end of the Peltier unit extending into the chamber in conductive contact with the heat sink solution; and air circulation means for flowing air through the condenser, whereby the Peltier units cool the condenser so that the air flowing through it is cooled to promote the condensation of water vapor within the condenser.

10. An apparatus as claimed in claim 9, wherein the electric power source is at least one solar voltaic cell releasably attached to the exterior wall of the condensing means, the solar cell being oriented so as to benefit from the convective air current generated by the heat radiating end of the first Peltier unit.

11. An apparatus as claimed in claim 8, wherein the condensing means comprises:

a thermally insulated chamber having exterior walls and interior walls defining a condenser extending centrally through the chamber, the condenser heaving open upper and lower ends, and the chamber containing a high thermal capacity heat sink solution;

air circulation means for flowing air through the condenser; and an absorption cycle refrigeration means for cooling the air flowing through the condenser sufficiently to cause condensation of water vapor from the air within the condenser.

12. An apparatus as claimed in claim 11, wherein the absorption cycle refrigeration means comprises:

a generator tank containing a refrigerant and an absorbent;

a plurality of heating channels which extend from the generator tank, the channels are oriented so as to receive solar energy and thereby cause vaporization of the refrigerant;

a separator tank is positioned above the generator and is connected to the heating channels so that vaporized heated refrigerant and liquid absorbent flow into the separator tank;

an air cooled refrigerant condenser is positioned above the separator tank in flow communication with it so that heated vaporized refrigerant flows into an upper end of the refrigerant condenser where it is condensed to its liquid phase and flows out a lower end of the refrigerant condenser;

an evaporator is positioned within the condenser defined by the interior walls of the insulated chamber, and the evaporator is in flow communication via a liquid filled U-tube trap with the lower end of the refrigerant condenser so that liquid refrigerant flowing through the evaporator absorbs sufficient heat from the air flowing by the evaporator to cause the condensation of water vapor from the flowing air;

an absorber tank is positioned below the evaporator and the separator tank but above the generator tank and is in flow communication with all of them, refrigerant from the evaporator flows into the absorber tank where it is taken into solution by liquid absorbent contained in the tank, the liquid absorbent flows into the absorber tank from the separator tank via a liquid filled U-tube trap, the refrigerant and absorbent solution flows from the absorber tank back to the generator tank, thus completing the cycle.

13. An apparatus as claimed in claim 12, wherein the refrigerant is ammonia and the absorbent is water.

14. An apparatus as claimed in claim 8, further comprising:

a valve atop the storage receptacle which may be opened to introduce water into it; and a container for the storage and release of water soluble plant nutrients, which container is positioned within the storage receptacle.

15. An apparatus as claimed in claim 14, wherein the container is a perforated basket.

16. An apparatus as claimed in claim 14, further comprising a dispenser attachable to the storage receptacle, the dispenser allowing the controlled release of plant anti-transpirants into the water of the storage receptacle.

17. An apparatus as claimed in claim 16, wherein the dispenser is located within the storage receptacle, and the dispenser has a lower end portion with a valve to enable the dispensing of anti-transpirants into the water of the storage receptacle.

18. An apparatus as claimed in claim 8, further comprising a water depth sensor positioned within the storage receptacle and delivery tube, the sensor providing the microprocessor with water depth data so that a determination of available water in storage can be made by the microprocessor.

* * * * *